(12) United States Patent
Nishimori et al.

(10) Patent No.: US 6,900,620 B2
(45) Date of Patent: May 31, 2005

(54) SWITCHING REGULATOR HAVING TWO OR MORE OUTPUTS

(75) Inventors: Eiji Nishimori, Kawasaki (JP); Toshiyuki Sekizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/390,020

(22) Filed: Mar. 18, 2003

(65) Prior Publication Data

US 2003/0184269 A1 Oct. 2, 2003

(30) Foreign Application Priority Data

Mar. 28, 2002 (JP) ........................................ 2002-092767

(51) Int. Cl.⁷ ............................................. G05F 1/577
(52) U.S. Cl. ........................................ 323/222; 323/267
(58) Field of Search ............................... 323/222, 225, 323/265, 267, 268, 271, 282

(56) References Cited

U.S. PATENT DOCUMENTS

| | | | |
|---|---|---|---|
| 5,122,724 A | * | 6/1992 | Criss ........................... 323/222 |
| 5,617,015 A | | 4/1997 | Goder et al. |
| 5,894,214 A | * | 4/1999 | Jiang ........................... 323/222 |
| 6,369,551 B1 | * | 4/2002 | Blumenkrantz et al. .... 323/244 |
| 6,437,545 B2 | * | 8/2002 | Sluijs .......................... 323/222 |

* cited by examiner

*Primary Examiner*—Adolf Berhane
(74) *Attorney, Agent, or Firm*—Arent Fox

(57) ABSTRACT

A switching regulator circuit includes an inductor, a first condenser which provides a potential stored therein as a first output of the switching regulator circuit, a second condenser which provides a potential stored therein as a second output of the switching regulator circuit, and a switch set including a plurality of switches, the switch set establishing a first path, a second path, and a third path, the first path supplying energy from a DC power supply to the inductor for accumulation of the energy therein, the second path supplying the energy accumulated in the inductor to the first condenser, and the third path supplying the energy accumulated in the inductor to the second condenser.

10 Claims, 19 Drawing Sheets

(a) SW1
(b) SW2
(c) CURRENT RUNNING THROUGH INDUCTOR L1
(d) WAVEFORM OF OUT1 POTENTIAL
(e) TRIANGULAR WAVE GENERATED INSIDE TIMING CONTROL CIRCUIT
(f) SW3
(g) SW4
(h) CURRENT RUNNING THROUGH INDUCTOR L2
(i) WAVEFORM OF OUT2 POTENTIAL (a) SW2
(b) SW4
(c) SW6
(d) SW7
(e) CURRENT RUNNING THROUGH INDUCTOR L1
(f) TRIANGULAR WAVE GENERATED INSIDE TIMING CONTROL CIRCUIT

SWITCHING REGULATOR HAVING TWO OR MORE OUTPUTS

CROSS-REFERENCE TO RELATED APPLICATIONS

The present application is based upon and claims the benefit of priority from prior Japanese Patent Application No. 2002-092767 filed on Mar. 28, 2002, with the Japanese Patent Office, the entire contents of which are incorporated herein by reference.

BACKGROUND OF THE INVENTION

1. Field of the Invention

The present invention generally relates to switching regulators, and particularly relates to a switching regulator which supplies a plurality of DC power supply voltages.

2. Description of the Related Art

In recent years, switching regulators have been used in a variety of electrical equipment, resulting in a demand for a low-cost switching regulator occupying a small space.

FIG. 1 is a circuit diagram showing a related-art switching regulator of a synchronous rectification type that can produce two output voltages higher than a input power potential.

The switching regulator of FIG. 1 is coupled to a DC power supply 1, and includes an inductor L1 for OUT1, a semiconductor switch SW1 for providing a current to the inductor L1 for OUT1, a rectifying diode 4 for OUT1, a semiconductor switch SW2 for OUT1, a rectifying smoothing condenser 6 for OUT1, an inductor L2 for OUT2, a semiconductor switch SW3 for providing a current to the inductor L2 for OUT2, a rectifying diode 10 for OUT2, a semiconductor switch SW4 for OUT2, a rectifying smoothing condenser 12 for OUT2, and timing control circuits 14 and 15. An output OUT1 appearing between the opposite ends of the rectifying something condenser 6 is supplied to a load 7. An output OUT2 appearing between the opposite ends of the rectifying smoothing condenser 12 is supplied to a load 13.

FIG. 2 is a timing chart for explaining the operation of the switching regulator shown in FIG. 1.

In FIG. 2, the switches SW1, SW2, SW3, and SW4 are closed (i.e., in a conductive state) during the HIGH period of respective timing control signals, and are open (i.e., in a nonconductive state) during the LOW period of the respective timing control signals. In the following, the operation of the circuit shown in FIG. 1 will be described with respect to the output OUT1.

When the switch SW1 is closed for a time t1 while the switch SW2 is open, an electric current is supplied from the DC power supply 1 to the inductor L1, resulting in the inductor L1 accumulating energy that is proportional to the square of the time t1. The accumulation of energy can be observed as the flow of an electric current running through the inductor as shown in FIG. 2(c).

The switch SW1 is then opened, immediately followed by closing the switch SW2 for a time t2. The energy accumulated in the inductor L1 is discharged through the switch SW2 (and the diode 4), moving to the condenser 6. As a result, the condenser 6 stores energy therein as electric charge, resulting in an increase in the terminal voltage OUT1.

After the end of the time t2, both the switches SW1 and SW2 are kept open, so that an electric current runs from the condenser 6 to the load 7. Until the switches SW1 and SW2 operate again (corresponding to a time t3), the energy of the condenser 6 continues to discharge, so that the terminal voltage OUT1 (FIG. 2(d)) decreases with time. Here, the voltage waveform shown in FIG. 2(d) illustrates an enlarged view of minute voltage changes.

The operations described above are repeated. When a certain operation state is achieved in which the energy stored in the condenser 6 matches the energy discharged, electric charge discharged from the condenser 6 is constantly replenished by the subsequent building up of charge. As a result, a direct current potential is obtained as the output OUT1.

The timing control circuit 14 compares the direct current potential of the output OUT1 with a predetermined potential. The timing control circuit 14 controls the switching timing of the switch SW1 to shorten the time t1 if the DC potential of the output OUT1 is higher, and to elongate the time t1 if the DC potential of the output OUT1 is lower. In the case of a PWM (pulse width modulation) method having a variable t1, a total of the time t1, the time t2, and the time t3 is constant, as determined by the clock frequency selected by the timing control circuit 14.

In the construction of FIG. 1, the switch SW2 may be removed, with only the rectifying diode 4 being in its place. In a silicon diode, however, a potential drop of approximately 0.6 V is generally generated when an electric current more than a few mA runs in the forward direction. Such a potential drop creates energy loss. When energy efficiency is of primary concern, therefore, the semiconductor switch SW2 is used that has a small ON resistance creating a lower potential drop than the diode. If only the semiconductor switch SW2 is used, however, it is possible that the switch SW2 is opened while some energy remains in the inductor L1. When this happens, the inductor L1 generates a high potential, which may destroy the circuit. Because of this, it is preferable to provide the diode 4 in parallel to the semiconductor switch SW2 as shown in FIG. 1 for the purpose of preventing the generation of such high potential.

The operations as described above are carried out with respect to the output OUT2 in the same manner.

In the construction of FIG. 1, the circuitry for the output OUT1 and the circuitry for the output OUT2 are separately provided, so that circuit components are provided in duplicate for both outputs. In a related-art switching regulator having a plurality of DC outputs, generally, circuit components such as an inductor, a diode, a semiconductor switch, and a condenser need to be provided as many as there are outputs. This results in a cost increase and also an increase in circuit size. An inductor is a circuit component that cannot easily be reduced in size, which hampers an effort to reduce costs and size.

Accordingly, there is a need for a switching regulator circuit which is reduced in costs and size.

SUMMARY OF THE INVENTION

It is a general object of the present invention to provide a switching regulator circuit that substantially obviates one or more problems caused by limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a switching regulator circuit particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a switching regulator circuit, including an inductor, a first condenser which provides a potential stored therein as a first output of the switching regulator circuit, a second condenser which provides a potential stored therein as a second output of the switching regulator circuit, and a switch set including a plurality of switches, the switch set establishing a first path, a second path, and a third path, the first path supplying energy from a DC power supply to the inductor for accumulation of the energy therein, the second path supplying the energy accumulated in the inductor to the first condenser, and the third path supplying the energy accumulated in the inductor to the second condenser.

In the switching regulator circuit described above, a single inductor is shared for a plurality of outputs. Among various circuit components, an inductor in particular is difficult to reduce its size. The reduction of the number of inductors through shared use will thus achieve cost reduction and significant size reduction. The number of outputs does not have to be two, and the invention works perfectly well even when the number of outputs is increased to three or more.

According to another aspect of the present invention, a switching regulator circuit includes an inductor, a condenser, and a switch set including a plurality of switches, the switch set establishing a first path, a second path, a third path, and a fourth path, the first path supplying energy from a DC power supply to the inductor for accumulation of the energy therein, the second path supplying the energy accumulated in the inductor to the condenser, the third path returning the energy accumulated in the condenser to the inductor, and the fourth path being a path through which the energy returned from the condenser to the inductor through the third path is returned to the DC power supply.

In the switching regulator circuit described above, energy that would be conventionally converted into excess heat at the time of the stoppage of output power supply is returned to the DC power supply provided at the input end of the switching regulator. With this provision, excess consumption can be reduced through energy recharge if the DC power supply is a secondary buttery of a rechargeable type.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 3:
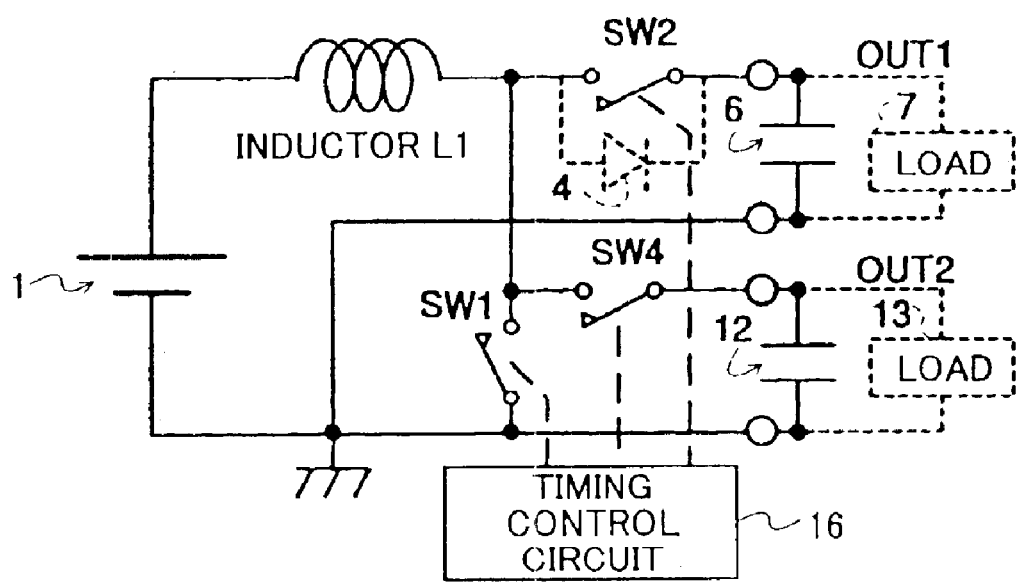
FIG. 3 is a circuit diagram showing a first embodiment of a switching regulator circuit according to the present invention.

FIG. 3 is a circuit diagram showing a first embodiment of a switching regulator circuit according to the present invention.

The switching regulator of FIG. 3 is coupled to a DC power supply 1, and includes an inductor L1 for shared use by OUT1 and OUT2, a semiconductor switch SW1 for providing a current to the inductor L1, a rectifying diode 4 for OUT1, a semiconductor switch SW2 for OUT1, a rectifying smoothing condenser 6 for OUT1, a semiconductor switch SW4 for OUT2, a rectifying smoothing condenser 12 for OUT2, and a timing control circuit 16. An output OUT1 appearing between the opposite ends of the rectifying smoothing condenser 6 is supplied to a load 7. An output OUT2 appearing between the opposite ends of the rectifying smoothing condenser 12 is supplied to a load 13.

Figure 4:
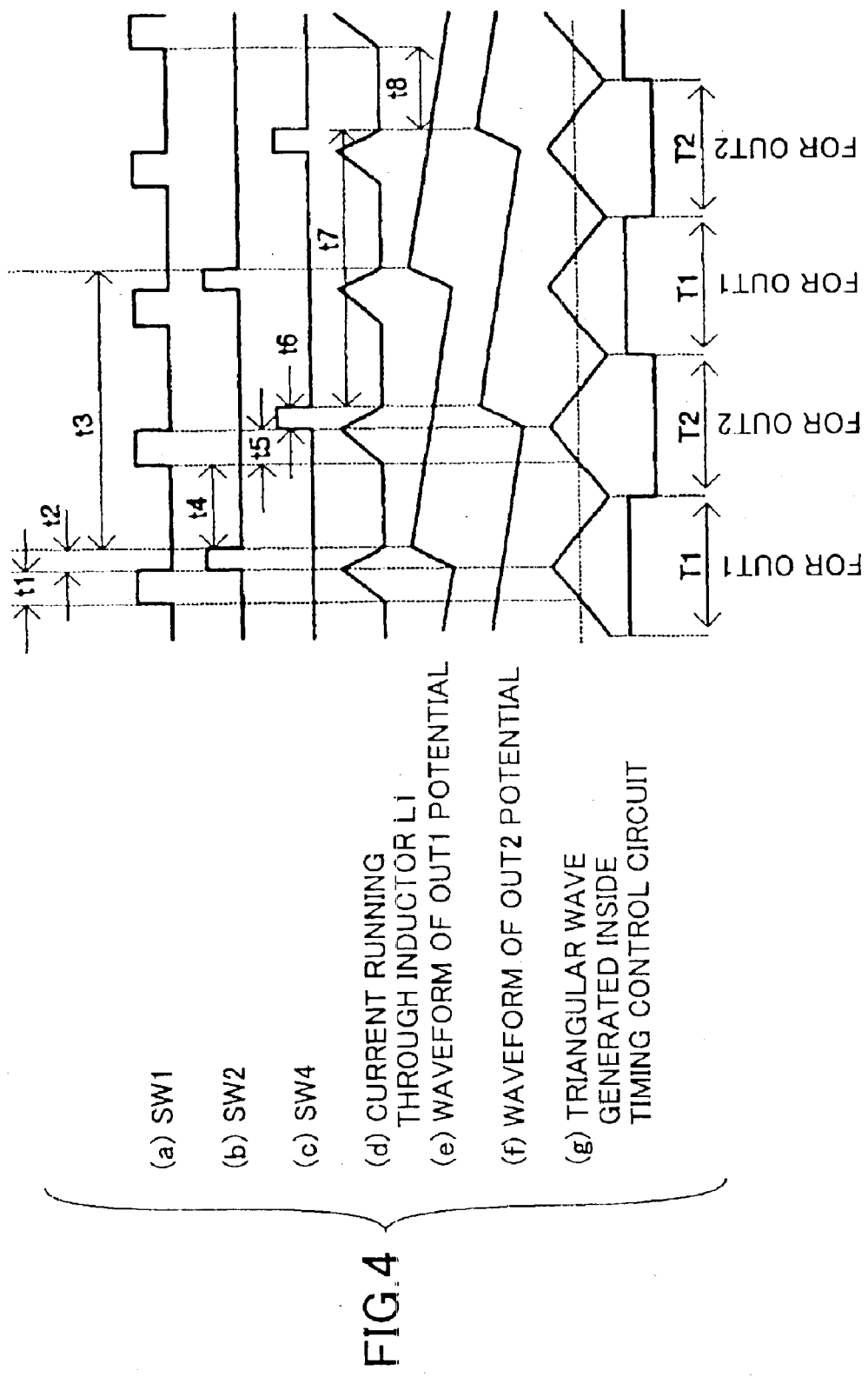
FIG. 4 is a timing chart for explaining the operation of the switching regulator shown in FIG. 3.

FIG. 4 is a timing chart for explaining the operation of the switching regulator shown in FIG. 3.

In FIG. 4, the switches SW1, SW2, and SW4 are closed (i.e., in a conductive state) during the HIGH period of respective switching control signals, and are open (i.e., in a nonconductive state) during the LOW period of the respective switching control signals. In the following, the operation of the circuit shown in FIG. 3 will be described with respect to the output OUT1.

When the switch SW1 is closed for a time t1 while the switches SW2 and SW4 are open, an electric current is supplied from the DC power supply 1 to the inductor L1, resulting in the inductor L1 accumulating energy that is proportional to the square of the time t1. The accumulation of energy can be observed as the flow of an electric current running through the inductor as shown in FIG. 4(d).

The switch SW1 is then opened, immediately followed by closing the switch SW2 for a time t2. The energy accumulated in the inductor L1 is discharged through the switch SW2 (and the diode 4), moving to the condenser 6. As a result, the condenser 6 stores energy therein as electric charge, resulting in an increase in the terminal voltage OUT1.

After the end of the time t2, the switch SW2 is kept open, so that an electric current runs from the condenser 6 to the load 7. Until the switches SW1 and SW2 operate again (corresponding to a time t3), the energy of the condenser 6 continues to discharge, so that the terminal voltage OUT1 (FIG. 4(e)) decreases with time. Here, the voltage waveform shown in FIG. 4(e) is an enlarged illustration of minute voltage changes.

The operations described above are repeated. When a certain operation state is achieved in which the energy stored in the condenser 6 matches the energy discharged, electric charge discharged from the condenser 6 is constantly replenished by the subsequent building up of charge. As a result, a direct current potential is obtained as the output OUT1. The timing control circuit 16 compares the direct current potential of the output OUT1 with a predetermined potential. The timing control circuit 16 controls the switching timing of the switch SW1 to shorten the time t1 if the DC potential of the output OUT1 is higher, and to elongate the time t1 if the DC potential of the output OUT1 is lower. In the case of a PWM (pulse width modulation) method having a variable t1, a total of the time t1, the time t2, and the time t3 is constant, as determined by the clock frequency selected by the timing control circuit 16.

For control of the output OUT2, thereafter, the switch SW1 is closed for a time t5 after the passage of a time t4 ($\geq 0$) from the end of the time period t2. An electric current runs from the DC power supply 1 to the inductor L1, resulting in the inductor L1 accumulating energy that is proportional to the square of the time t5. The accumulation of energy can be observed as the flow of an electric current running through the inductor as shown in FIG. 4(d).

The switch SW1 is then opened, immediately followed by closing the switch SW4 for a time t6. The energy accumulated in the inductor L1 is discharged through the switch SW4, moving to the condenser 12. As a result, the condenser 12 stores energy therein as electric charge, resulting in an increase in the terminal voltage OUT2.

After the end of the time t6, the switch SW4 is kept open, so that an electric current runs from the condenser 12 to the load 13. Until the switches SW1 and SW4 operate again (corresponding to a time t7), the energy of the condenser 12 continues to discharge, so that the terminal voltage OUT2 (FIG. 4(f)) decreases with time. Here, the voltage waveform shown in FIG. 4(f) is an enlarged illustration of minute voltage changes.

The operations described above are repeated. When a certain operation state is achieved in which the energy stored in the condenser 12 matches the energy discharged, electric charge discharged from the condenser 12 is constantly replenished by the subsequent building up of charge. As a result, a direct current potential is obtained as the output OUT2. The timing control circuit 16 compares the direct current potential of the output OUT2 with a predetermined potential. The timing control circuit 16 controls the switching timing of the switch SW1 to shorten the time t5 if the DC potential of the output OUT2 is higher, and to elongate the time t5 if the DC potential of the output OUT2 is lower.

In the switching regulator according to the present invention, a single inductor is shared for a plurality of outputs. Among various circuit components, an inductor in particular is difficult to reduce in size. The reduction of the number of inductors through shared use will thus achieve cost reduction and significant size reduction. Although only two outputs are provided in the embodiment described above, the same operation principle works even when the number of outputs is increased to three or more.

In the construction of FIG. 3, if the diode 4 is not provided, an end of the inductor coupled to the switches produces a high potential for an instant when all the switches are opened, which may result in an unbearable potential being applied to circuit components. The provision of the diode 4 in parallel to the switch SW2 can suppress potential appearing at the end of the inductor coupled to the switches, such that the potential does not exceed the output potential plus the forward bias of the diode. A high potential that is generated at the severance of the switch SW4 can also be released through the diode 4. Only a single diode thus suffices to prevent the generation of high potential. If another diode is provided in parallel to the switch SW4, the inductor L1 is coupled to OUT2 through this additional diode as well as to OUT1 through the diode 4, resulting in OUT1 and OUT2 being at the same potential.

A switch (i.e., the switch SW2 or SW4 in the example of FIG. 3) may be removed so as to use only a diode at the removed position if this position corresponds to an output terminal producing the highest potential among all the output terminals. If the output potential is high, loss at the diode does not result in a large drop in efficiency. Using only a diode for the output having the highest potential thus achieves cost reduction and size reduction without too much sacrifice of efficiency.

By the same token, the parallel connection of a switch and a diode is preferably provided at a position corresponding to the output terminal producing the highest potential.

Figure 5:
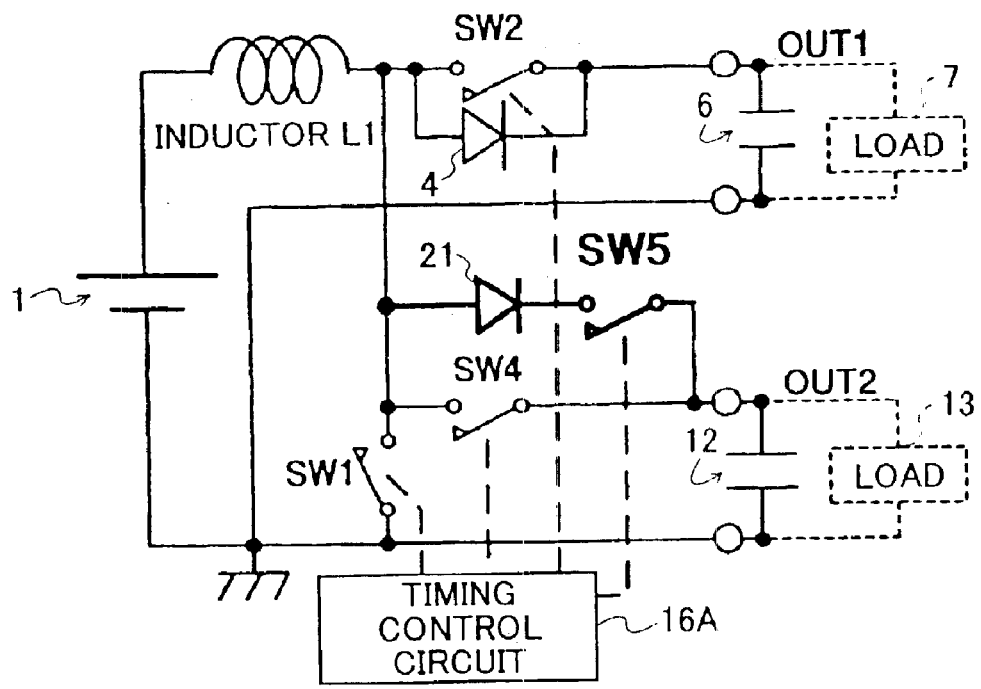
FIG. 5 is a circuit diagram showing a second embodiment of the switching regulator circuit according to the present invention.

FIG. 5 is a circuit diagram showing a second embodiment of the switching regulator circuit according to the present invention. In FIG. 5, the same elements as those of FIG. 3 are referred to by the same numerals, and a description thereof will be omitted. The switching regulator of the second embodiment includes a diode 21 and a switch SW5 in addition to the construction of the switching regulator of the first embodiment shown in FIG. 3.

In the switching regulator of the first embodiment shown in FIG. 3, if OUT1 coupled to the diode 4 is disconnected from the load, residual energy in the inductor L1 remaining after the opening of the switch SW4 may significantly boost the output potential of the output OUT1. To cope with this, the diode 21 and the switch SW5 are provided as shown in FIG. 5, so that the residual energy is output to OUT2 through the diode 21 and the switch SW5 after the opening of the switch SW4. The switching timing of the switch SW5 is controlled by a timing control circuit 16A.

Figure 6:
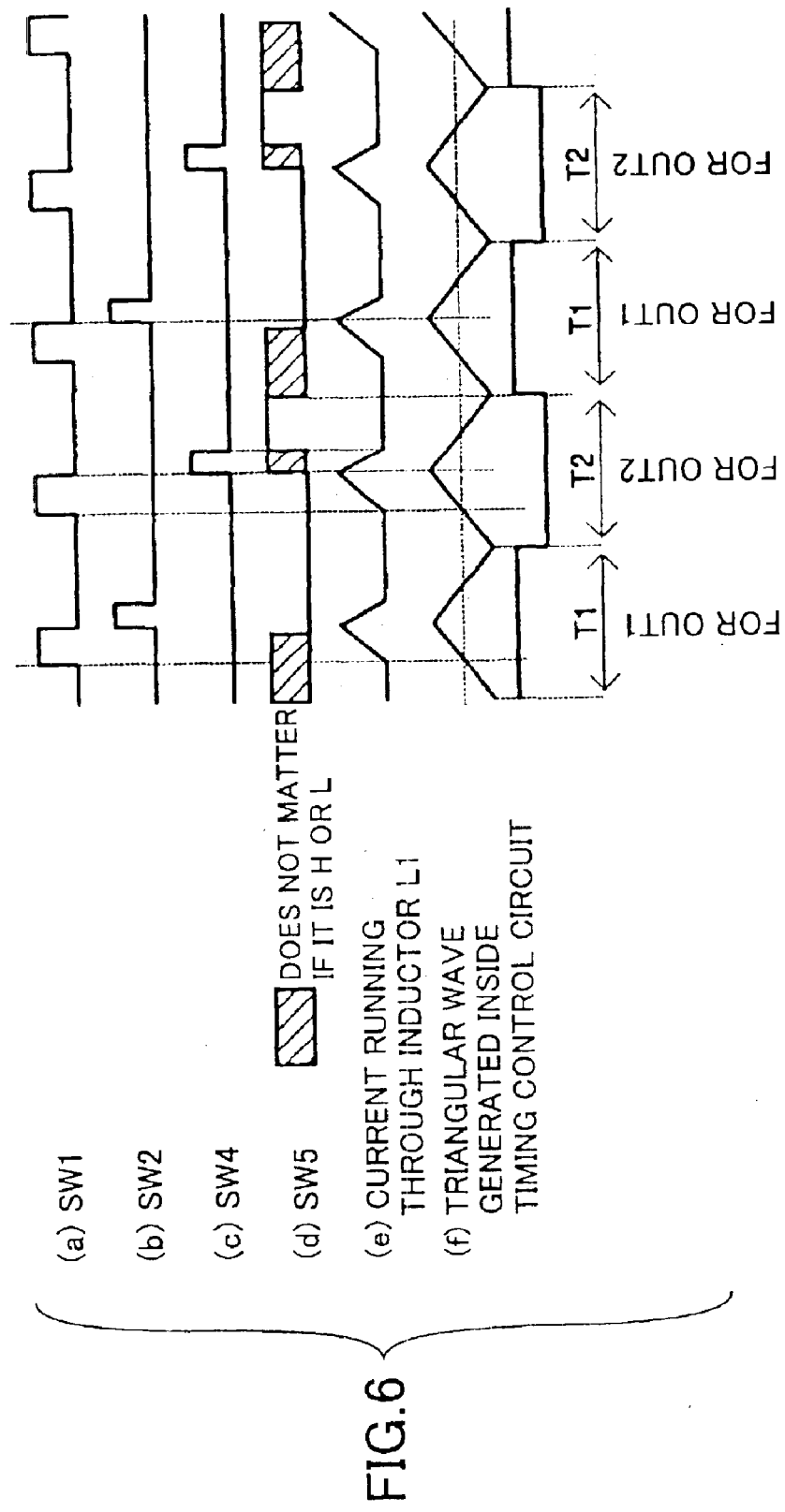
FIG. 6 is a timing chart showing the operation of the switching regulator of FIG. 5.

FIG. 6 is a timing chart showing the operation of the switching regulator of FIG. 5.

As shown in FIG. 6, the switch SW5 may be closed concurrently with the switch SW4, or may be closed at the time the switch SW4 is opened. Alternatively, the switch SW5 may be closed simultaneously with the opening of the switch SW1 relating to the generation of OUT2. The opening timing of the switch SW4 may be set at the end of the oscillation cycle of OUT2, or may be set prior to the start of the ON cycle of OUT1.

With the construction of the second embodiment as described above, the switch SW5 is closed at proper timing, so that residual energy in the inductor L1 remaining at the opening of the switch SW4 is prevented from leaking to the output OUT1 even when no load is connected to the output OUT1.

Figure 7:
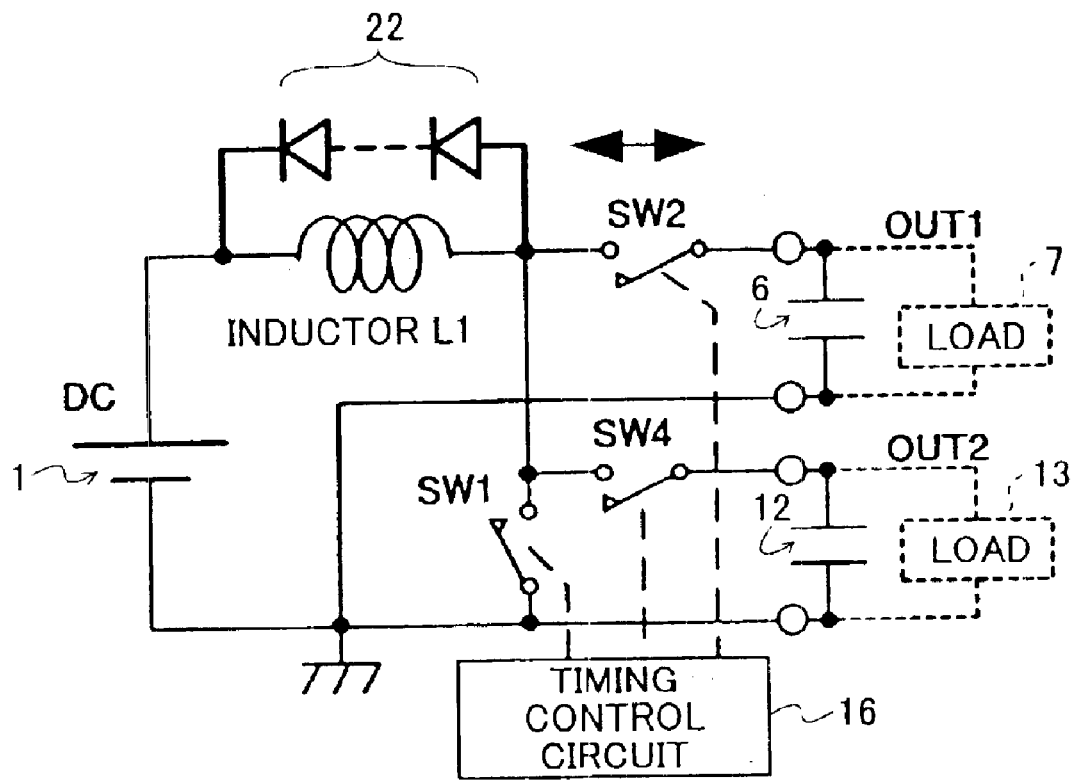
FIG. 7 is a circuit diagram showing a third embodiment of the switching regulator circuit according to the present invention.

FIG. 7 is a circuit diagram showing a third embodiment of the switching regulator circuit according to the present invention. In FIG. 7, the same elements as those of FIG. 3 are referred to by the same numerals, and a description thereof will be omitted. The switching regulator of the third embodiment includes a diode series 22 replacing the diode 4 of the switching regulator of the first embodiment shown in FIG. 3. The diode series 22 is provided in parallel with the inductor L1.

Figure 8:
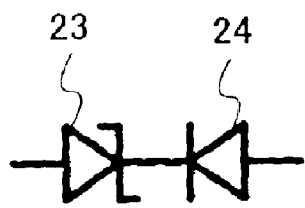
FIG. 8 is a circuit diagram showing a combination of a Zener diode and a diode.

In the construction shown in FIG. 7, the diode series 22 comprised of a plurality of diodes connected in series is provided in parallel with the inductor L1 for the purpose of preventing high potential from appearing upon the opening of the switch SW2 or SW4. The diode series 22 serves as a limiter that limits the potential between the opposite ends of the inductor. The limit potential is determined by the number of diodes. This prevents high potential from appearing at the end of the inductor L1 coupled to the switches, thereby avoiding the generation of high potential at the output OUT1. A combination of a Zener diode 23 and a diode 24 as shown in FIG. 8 may be used in place of the diode series 22, thereby setting a proper limit potential.

Figure 9:
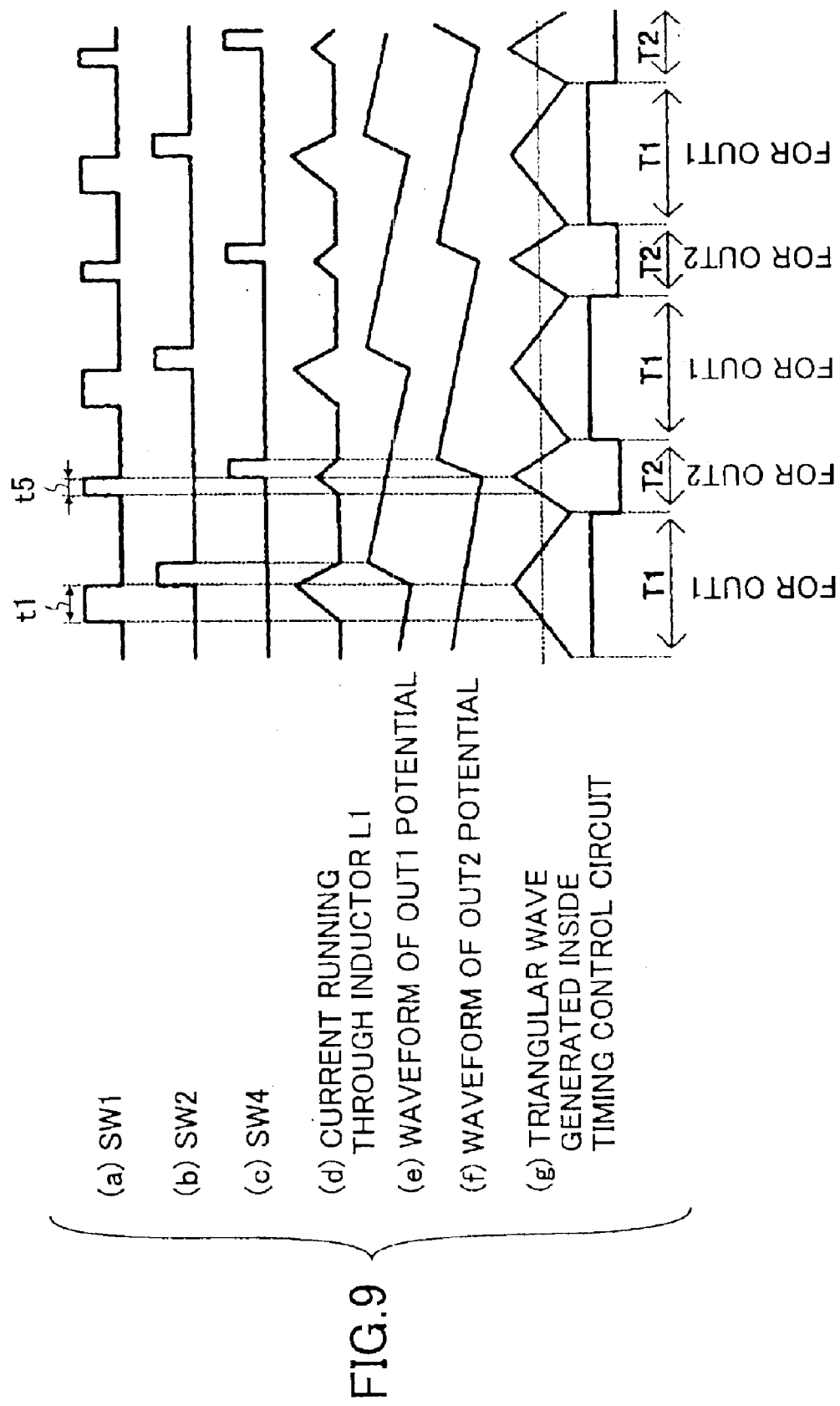
FIG. 9 is a circuit diagram showing a forth embodiment of the switching regulator circuit according to the present invention.

FIG. 9 is a circuit diagram showing a forth embodiment of the switching regulator circuit according to the present invention.

The fourth embodiment shown in FIG. 9 has the energy charging periods t1 and t5 different from each other where the periods t1 and t5 correspond to OUT1 and OUT2, respectively. When current consumption and output potential vary between the plurality of outputs OUT1 and OUT2, the periods t1 and t5 are independently controlled according to their needs. The maximum energy accumulated in the inductor L1 thus varies accordingly, thereby producing output potentials that match the required specifications.

Figure 2:
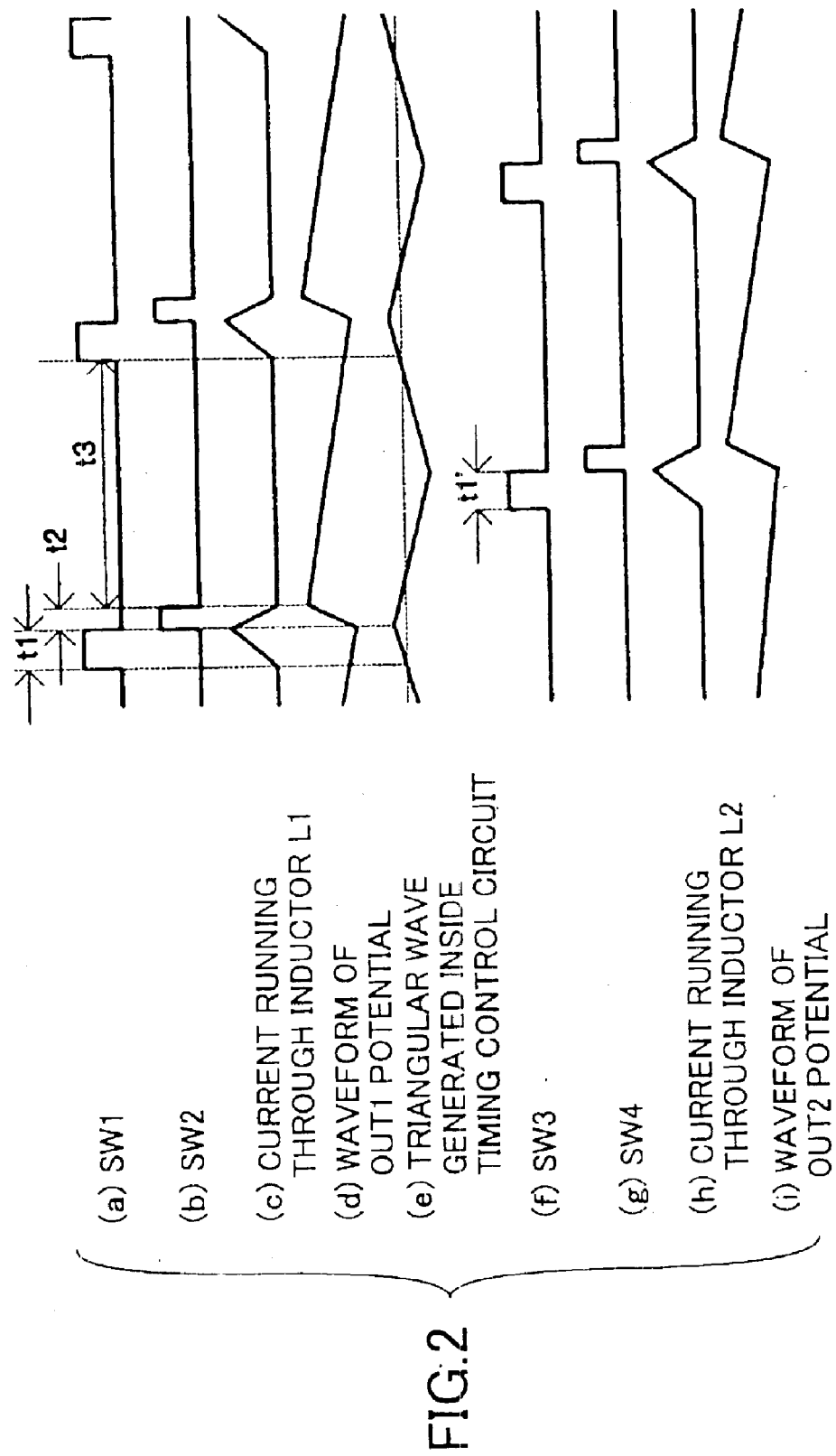
FIG. 2 is a timing chart for explaining the operation of the switching regulator shown in FIG. 1.

In general, a timing control circuit for a switching regulator generates a triangular wave for controlling the switching timing. This triangular wave is shown in FIG. 2 and FIG. 4 as a timing reference. The potential of the triangular wave is compared with a predetermined threshold potential, thereby controlling the switching of each switch. In the fourth embodiment of FIG. 9, the positive transition time and the negative transition time of the triangular wave are controlled, so that the switching timing of the switches can readily be controlled to achieve desired timing.

Figure 1:
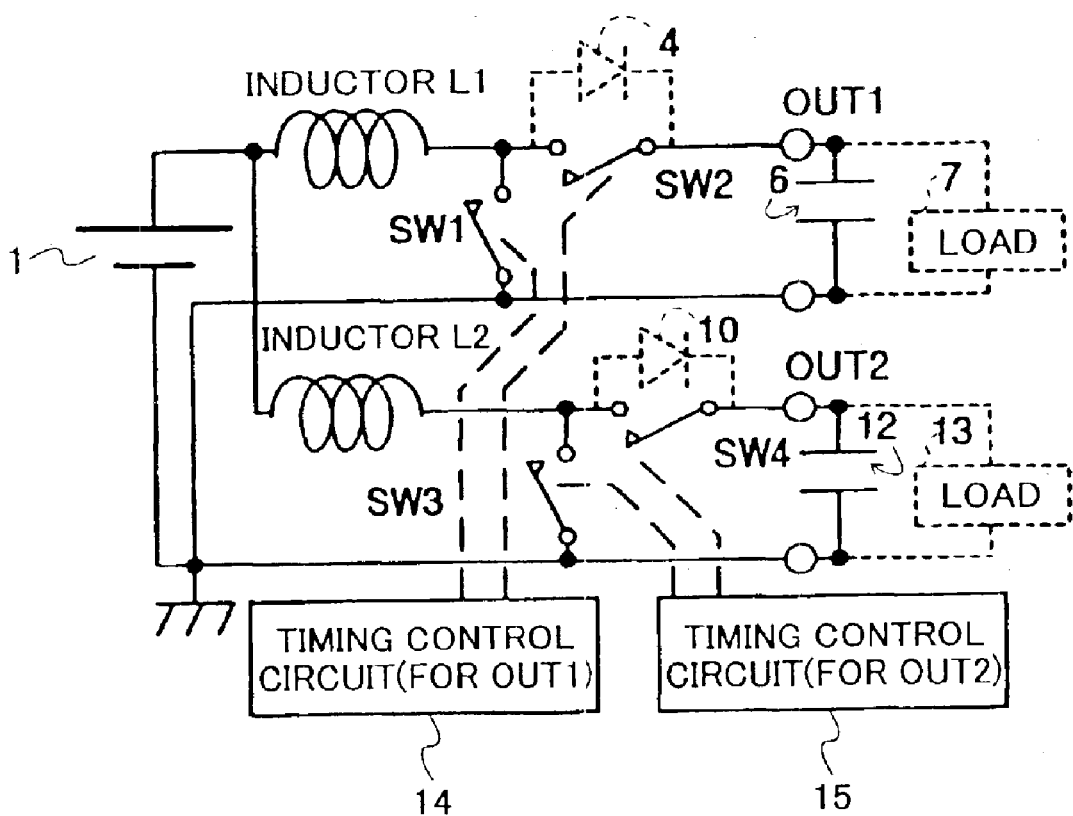
FIG. 1 is a circuit diagram showing a related-art switching regulator of a synchronous rectification type that can produce two output voltages higher than an input power potential.
Figure 10:
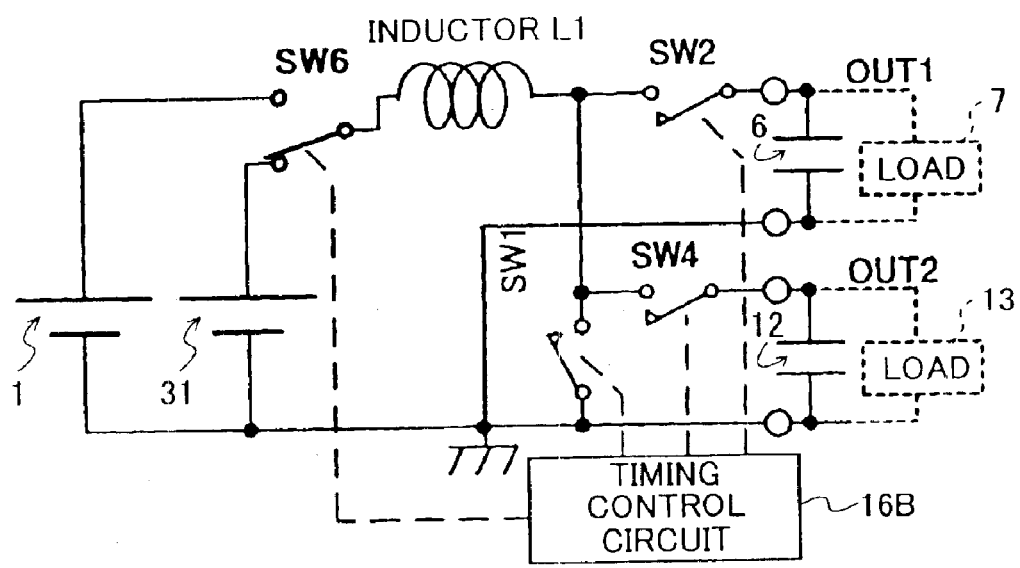
FIG. 10 is a circuit diagram showing a fifth embodiment of the switching regulator circuit according to the present invention.

FIG. 10 is a circuit diagram showing a fifth embodiment of the switching regulator circuit according to the present invention. In FIG. 10, the same elements as those of FIG. 3 are referred to by the same numerals, and a description thereof will be omitted. The switching regulator of the fifth embodiment includes a DC power supply 31 and a switch SW6 newly provided in addition to the construction of the switching regulator of the first embodiment shown in FIG. 1. In this manner, the fifth embodiment is configured in such a manner as to switch the power supply, with the provision of the two different DC power supplies 1 and 31 and the switch SW6 coupled to the inductor L1. The switching timing of each switch is controlled by a timing control circuit 16B.

Figure 11:
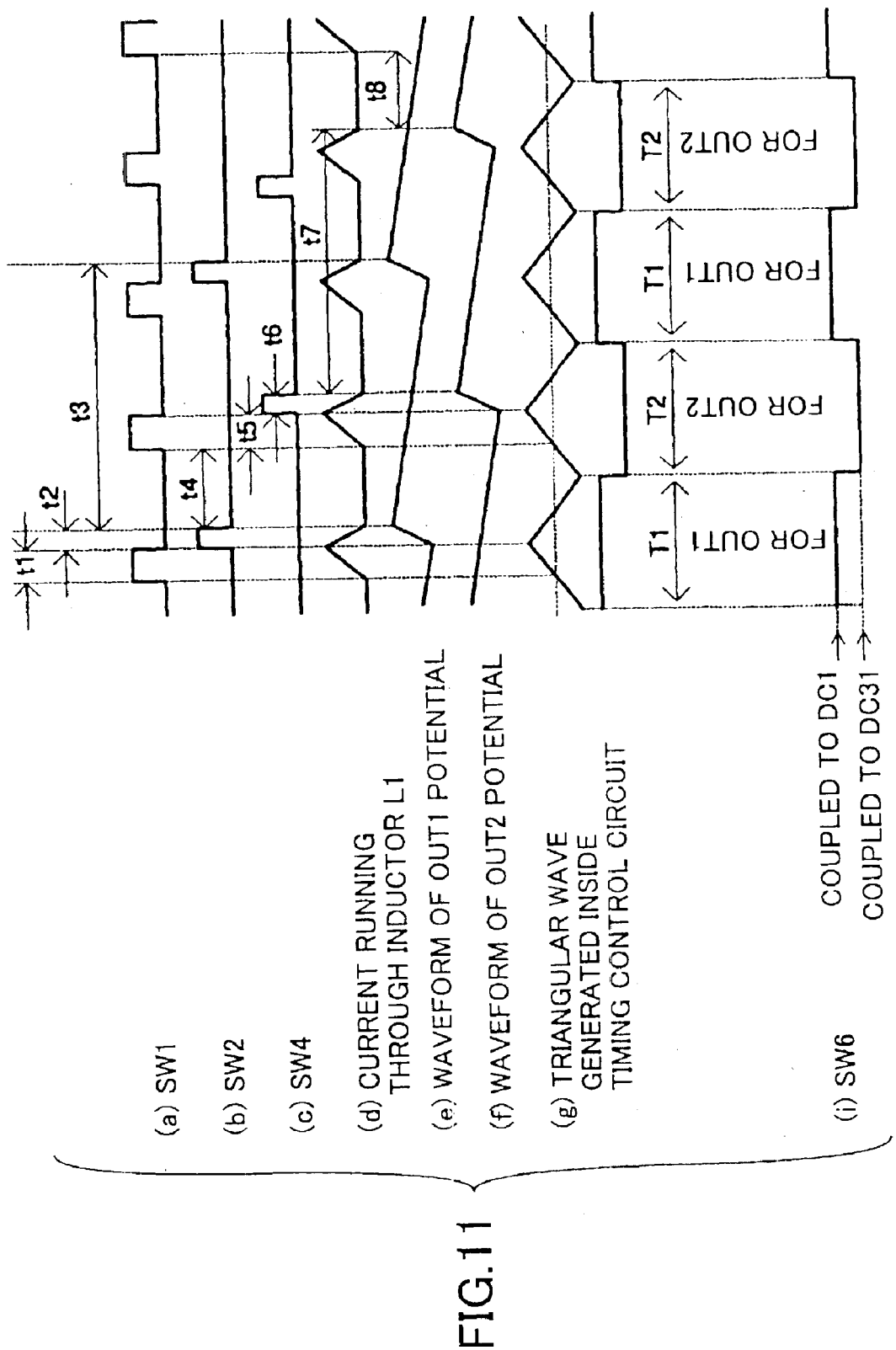
FIG. 11 is a timing chart showing the operation of the switching regulator shown in FIG. 10.

FIG. 11 is a timing chart showing the operation of the switching regulator shown in FIG. 10.

When the switch SW6 provides a path to the DC power supply 1 in response to the timing control signal shown in FIG. 11(c), energy accumulated in the inductor L1 is supplied to OUT1 by the operations of the switches SW1 and SW2. When the switch SW6 provides a path to the DC power supply 31, energy accumulated in the inductor L1 is supplied to OUT2 by the operations of the switches SW1 and SW4. These operations are repeated, so that the DC power supply 1 is used as a dedicated power supply for OUT1, and the DC power supply 31 is used as a dedicated power supply for OUT2. Although two DC power supplies and two outputs are provided in this example, the same operation can be carried out even when the number of the DC power supplies and outputs is increased to three or more. Further, the number of the DC power supplies and the number of outputs may differ from each other.

Figure 12:
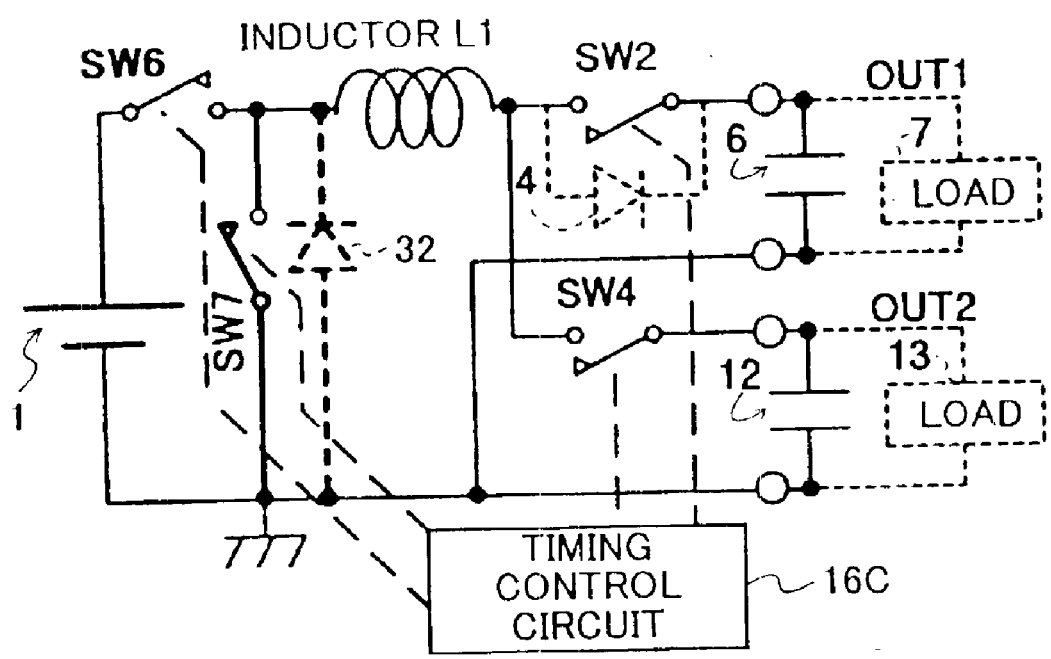
FIG. 12 is a circuit diagram showing a sixth embodiment of the switching regulator circuit according to the present invention.

FIG. 12 is a circuit diagram showing a sixth embodiment of the switching regulator circuit according to the present invention. In FIG. 12, the same elements as those of FIG. 3 are referred to by the same numerals, and a description thereof will be omitted. The switching regulator of the sixth embodiment includes a diode 32 and switches SW6 and SW7 additionally provided compared with the switching regulator of the first embodiment of FIG. 3. Also, the switch SW1 of the first embodiment is removed in the sixth embodiment. The switching timing of each switch is controlled by a timing control circuit 16C.

The first embodiment of FIG. 3 is directed to a boost-type power supply (i.e., the DC potential of the DC power supply 1 being smaller than the potentials of OUT1 and OUT2). The construction of FIG. 12, on the other hand, is directed to a reduction-type power supply that produces OUT1 and OUT2 having their potential lower than the potential of the DC power supply 1.

Figure 13:
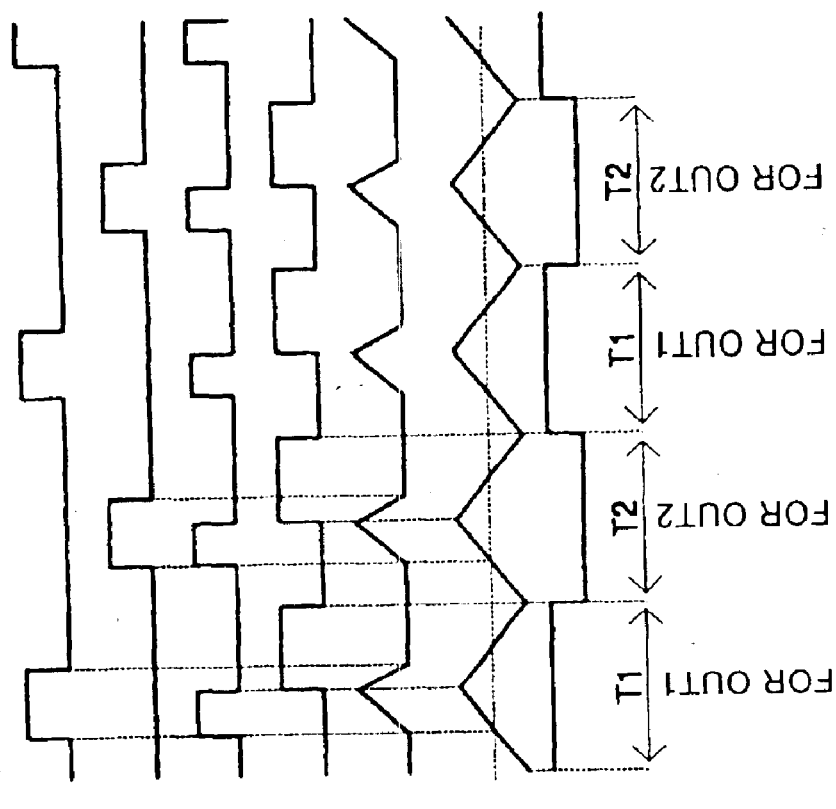
FIG. 13 is a timing chart showing the operation of the switching regulator of FIG. 12.

FIG. 13 is a timing chart showing the operation of the switching regulator of FIG. 12.

As shown in FIG. 13, the switches SW2 and SW6 are simultaneously closed to accumulate energy in both the inductor L1 and the condenser 6. The switch SW6 is then opened, and, at the same time, the switch SW7 is closed. Energy accumulated in the inductor L1 is supplied to the output OUT1 through the switch SW2, and energy stored in the condenser 6 is supplied to the load 7 as an electric current. The switch SW2 is then opened at the time the energy accumulated in the inductor L1 becomes zero simultaneously with the stoppage of the electric current running through the inductor L1. Thereafter, the energy stored in the condenser 6 continues to discharge to the load 7 until the switch SW2 is operated again.

The same operation is carried out for OUT2. The switches SW4 and SW6 are simultaneously closed to accumulate energy in both the inductor L1 and the condenser 12. The switch SW6 is then opened, and, at the same time, the switch SW7 is closed. Energy accumulated in the inductor L1 is supplied to the output OUT2 through the switch SW4, and energy stored in the condenser 12 is supplied to the load 7 as an electric current. The switch SW4 is then opened at the time the energy accumulated in the inductor L1 becomes zero simultaneously with the stoppage of the electric current running through the inductor L1. Thereafter, the energy stored in the condenser 12 continues to discharge to the load 13 until the switch SW4 is operated again.

In the circuit of FIG. 2, the switches SW2 and SW6 are simultaneously closed to accumulate energy in the inductor L1 and the condenser 6 in respect to the output OUT1. When this is done, the output potential OUT1 appearing between the opposite ends of the condenser 6 is always lower than the potential supplied by the DC power supply 1. The output OUT1 is thus a reduced potential that is lower the potential supplied by the DC power supply 1. The same applies in the case of OUT2.

Figure 14:
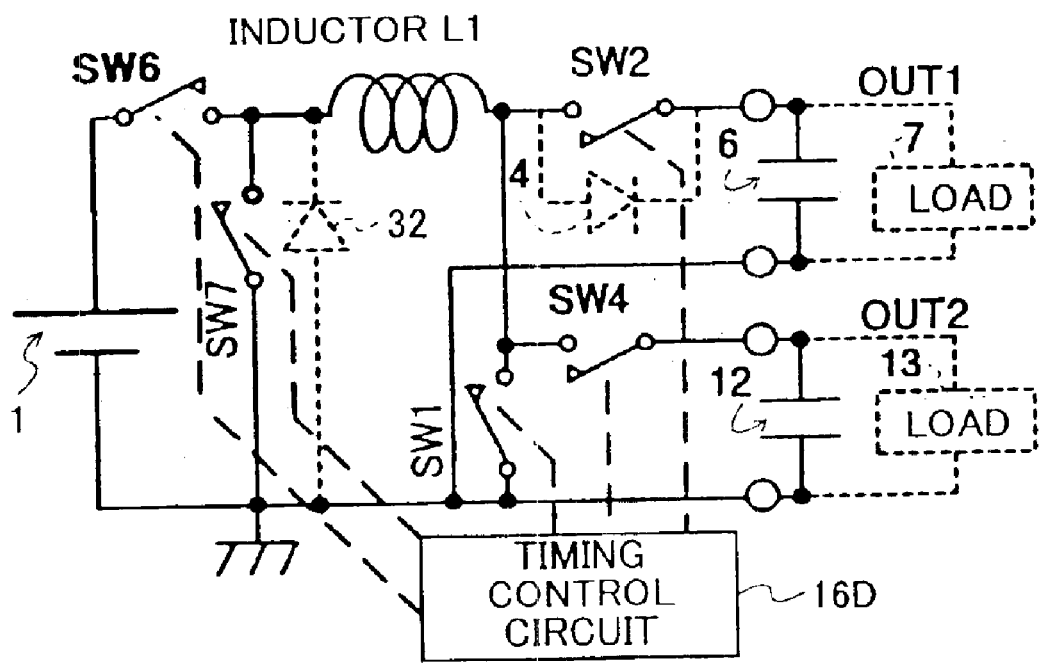
FIG. 14 is a circuit diagram showing a seventh embodiment of the switching regulator circuit according to the present invention.

FIG. 14 is a circuit diagram showing a seventh embodiment of the switching regulator circuit according to the present invention. In FIG. 14, the same elements as those of FIG. 12 are referred to by the same numerals, and a description thereof will be omitted. The switching regulator of the seventh embodiment has a switch SW1 additionally provided in addition to the switching regulator of the sixth embodiment shown in FIG. 12. The switch SW1 is the same as that used in the first embodiment. The switching timing of each switch is controlled by a timing control circuit 16D.

The sixth embodiment shown in FIG. 12 is directed to a reduction-type power supply in which the potentials of OUT1 and OUT2 are lower than the potential supplied by the DC power supply 1. The construction of FIG. 14, on the other hand, is directed to a boost/reduction-type power supply that produces OUT1 and OUT2 having their potential higher or lower than the potential of the DC power supply 1 as determined by settings.

Figure 15:
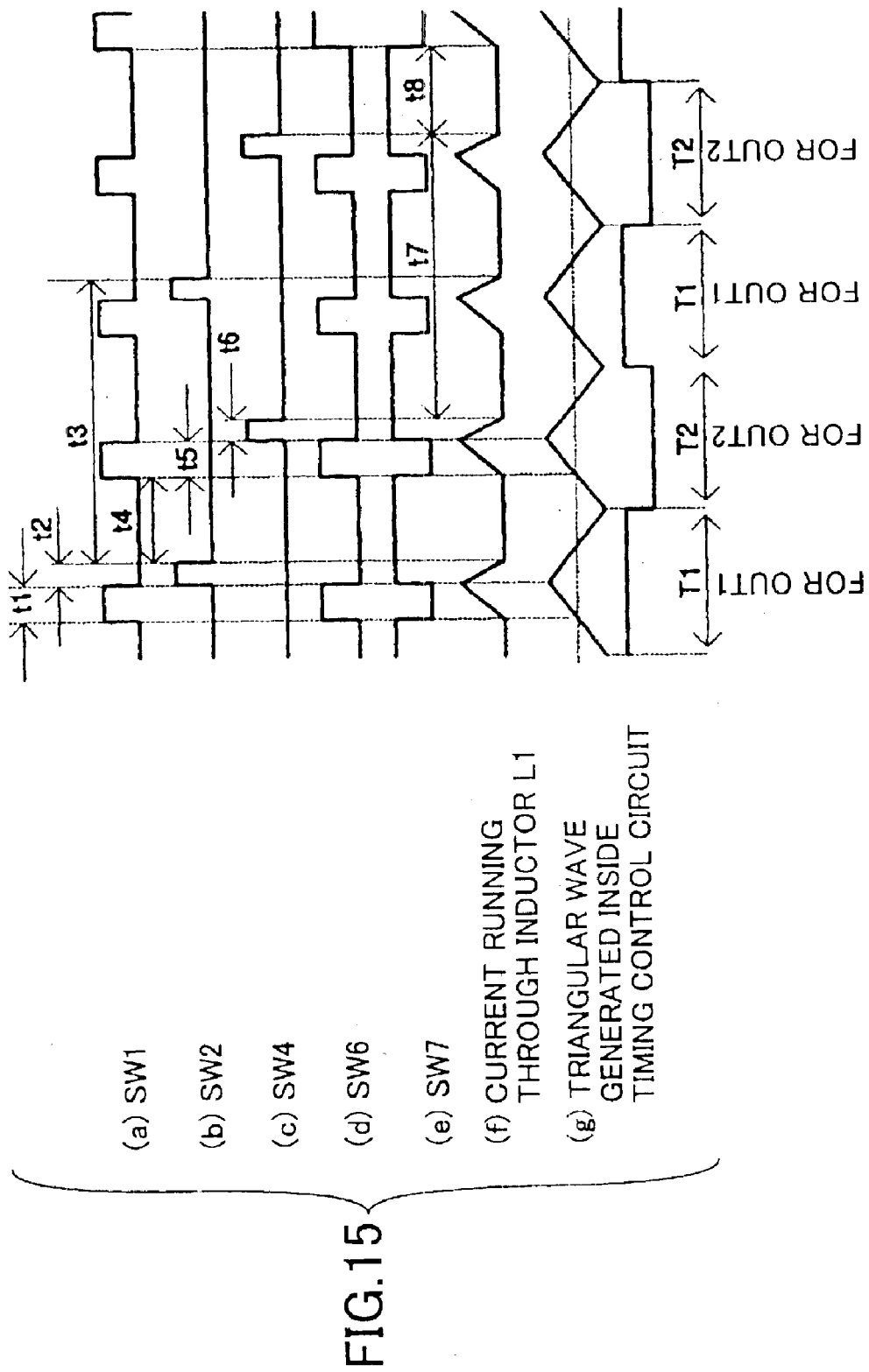
FIG. 15 is a timing chart showing the operation of the switching regulator of FIG. 14.

FIG. 15 is a timing chart showing the operation of the switching regulator of FIG. 14.

As shown in FIG. 13, the switches SW1 and SW6 are simultaneously closed to accumulate energy in the inductor L1 while the switches SW2 and SW7 are open. The switches SW1 and SW6 are then opened, and, at the same time, the switches SW2 and SW7 are closed. Energy accumulated in the inductor L1 is supplied to the output OUT1 through the switch SW2, being stored in the condenser 6. The switch SW2 is then opened at the time the energy accumulated in the inductor L1 becomes zero simultaneously with the stoppage of the electric current running through the inductor L1. Thereafter, the energy stored in the condenser 6 continues to discharge to the load 7 until the switch SW2 is operated again. The same operation is also carried out for OUT2.

In the first embodiment shown in FIG. 3, the potential applied to the output OUT1 when the switches SW1 and SW2 are open and closed, respectively, is a sum of the potential supplied by the DC power supply 1 and the potential generated by the energy discharged from the inductor L1. As a result, OUT1 is a boosted potential in the construction of FIG. 3 (the same applies in the case of OUT2). In the sixth embodiment shown in FIG. 12, when energy is accumulated in the inductor L1 and the condenser 6 by simultaneously closing the switches SW2 and SW6, the output potential OUT1 appearing between the opposite ends of the condenser 6 is always lower than the potential supplied by the DC power supply 1. AS a result, OUT1 is a reduced potential in the construction of FIG. 12 (the same applies in the case of OUT2).

In the seventh embodiment of FIG. 14, on the other hand, the switches SW2 and SW7 are closed while the switches SW1 and SW6 are open, thereby supplying energy of the inductor L1 to the condenser 6. The potential of the output OUT1 is determined by the ratio of the energy supply from the inductor L1 to the energy consumption by the load 7. The timing control circuit 16D controls the closed period of the switches SW1 and SW6 during which energy is accumulated in the inductor L1, thereby controlling energy supply from the inductor L1 to the condenser 6. Through this control, the timing control circuit 16D can generate a desired potential (either a boosted potential or a reduced potential).

In the construction of FIG. 14, all the switches may be open during the time t4 and the time t8 shown in FIG. 15. In order to avoid an unstable potential appearing at the end of the inductor L1, however, either the switch SW1 or the switch SW7 is preferably closed so as to couple an end of the inductor L1 to the ground potential.

Moreover, the switches SW1 and SW7 may be closed when the switch SW2 or SW4 is opened. This avoids a potential rise at the end of the inductor L1 (which results in an unstable potential), thereby eliminating a need for the diode 4 provided in parallel to the switch SW2. When the switches SW2 and SW4 are provided in an LSI, in particular, high speed switching is attainable, so that the switching as described above is readily performed.

Figure 16:
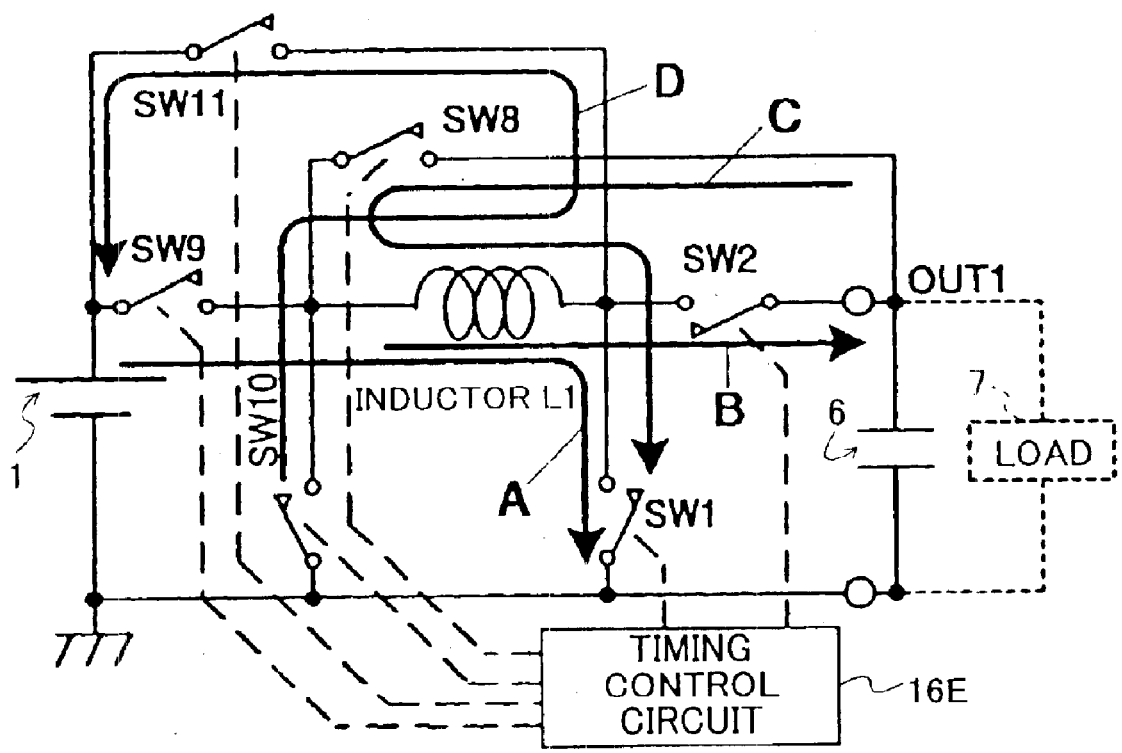
FIG. 16 is a circuit diagram showing an eighth embodiment of the switching regulator circuit according to the present invention.

FIG. 16 is a circuit diagram showing an eighth embodiment of the switching regulator circuit according to the present invention. In FIG. 16, the same elements as those of FIG. 3 are referred to by the same numerals, and a description thereof will be omitted. The switching regulator of the eight embodiment includes switches SW8 through SW11 in addition to the construction of the switching regulator of the first embodiment shown in FIG. 3. The switching timing of each switch is controlled by a timing control circuit 16E. Although only a single output OUT1 is shown in FIG. 16, a plurality of outputs may be provided in the same manner as in the first embodiment.

The switching regulator of the eighth embodiment is directed to a circuit that reduces energy squandering when frequent switching on/off of the power supply output is performed. In general, a smoothing condenser is provided at the output of power supply for the purpose of stabilizing the output potential. When there is a need to rapidly bring down the output potential to zero, provision is conventionally made to consume the energy of the condenser by use of a resistor or the like so as to convert the energy into heat. In the circuit of FIG. 16, energy that would be conventionally converted into excess heat is returned to the DC power supply provided at the input end of the switching regulator. With this provision, excess consumption can be reduced through energy recharge if the DC power supply 1 is a secondary buttery of a rechargeable type.

Figure 17:
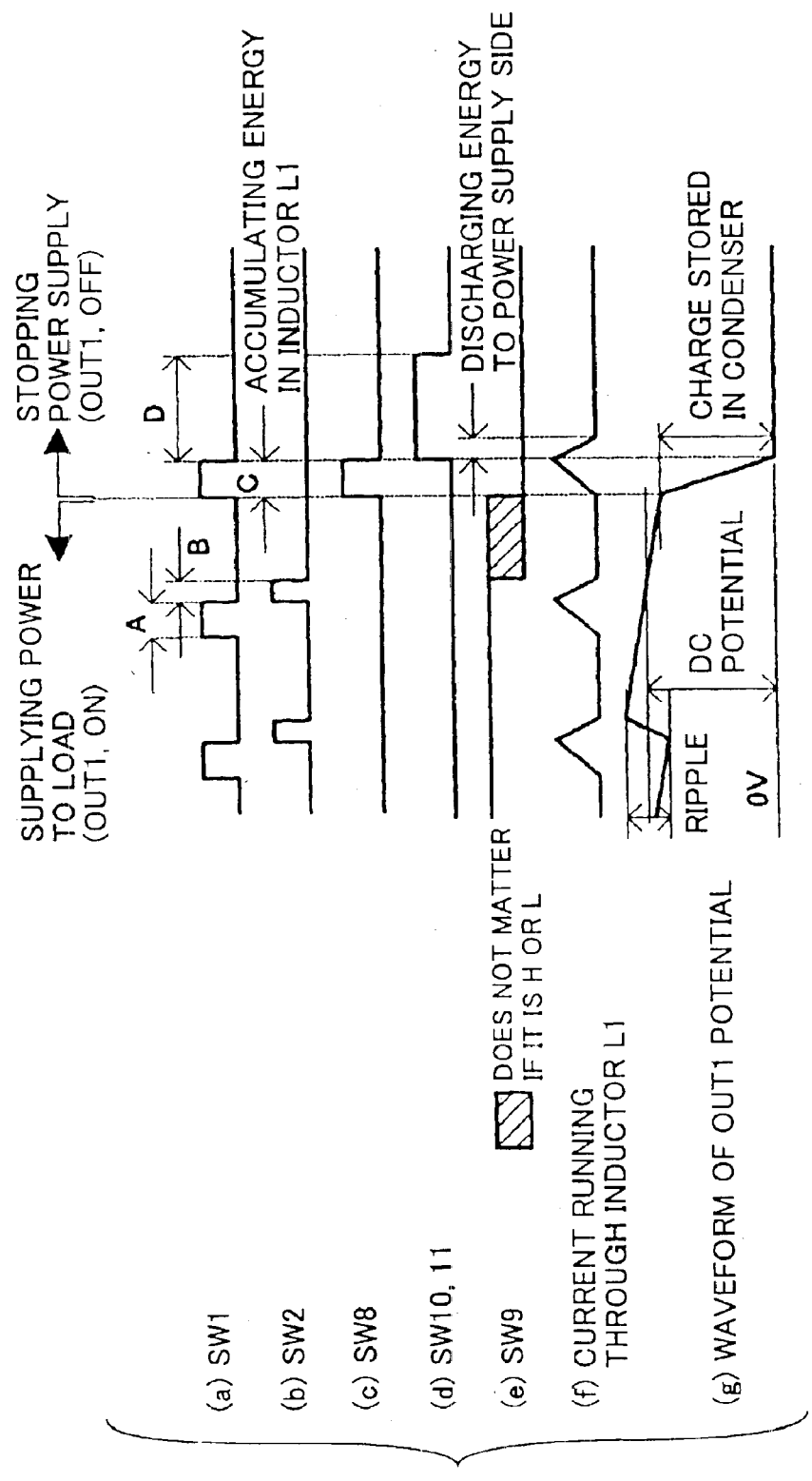
FIG. 17 is a timing chart showing the operation of the switching regulator of FIG. 16.

FIG. 17 is a timing chart showing the operation of the switching regulator of FIG. 16. In the case of supplying power to the load 7, the switches SW1 and SW9 are closed to accumulate energy in the inductor L1 through a path A shown in FIG. 16 and FIG. 17, as in the first embodiment. The switch SW1 is then opened, and the switch SW2 is closed, moving energy from the inductor L1 to the condenser 6 through a path B. Power is thereafter supplied to the load 7 as the condenser 6 discharges. When power supply to the load 7 is to be stopped, the switches SW1 and SW8 are closed to establish a path C as shown in FIG. 16 and FIG. 17. Charge remaining in the condenser 6 is discharged for energy storage in the inductor L1. The switches SW1 and SW8 are then opened, and the switches SW10 and SW11 are closed to establish a path D, through which the energy stored in the inductor L1 is returned to the DC power supply 1. In this manner, energy that was conventionally squandered can be returned to the DC power supply.

Figure 18:
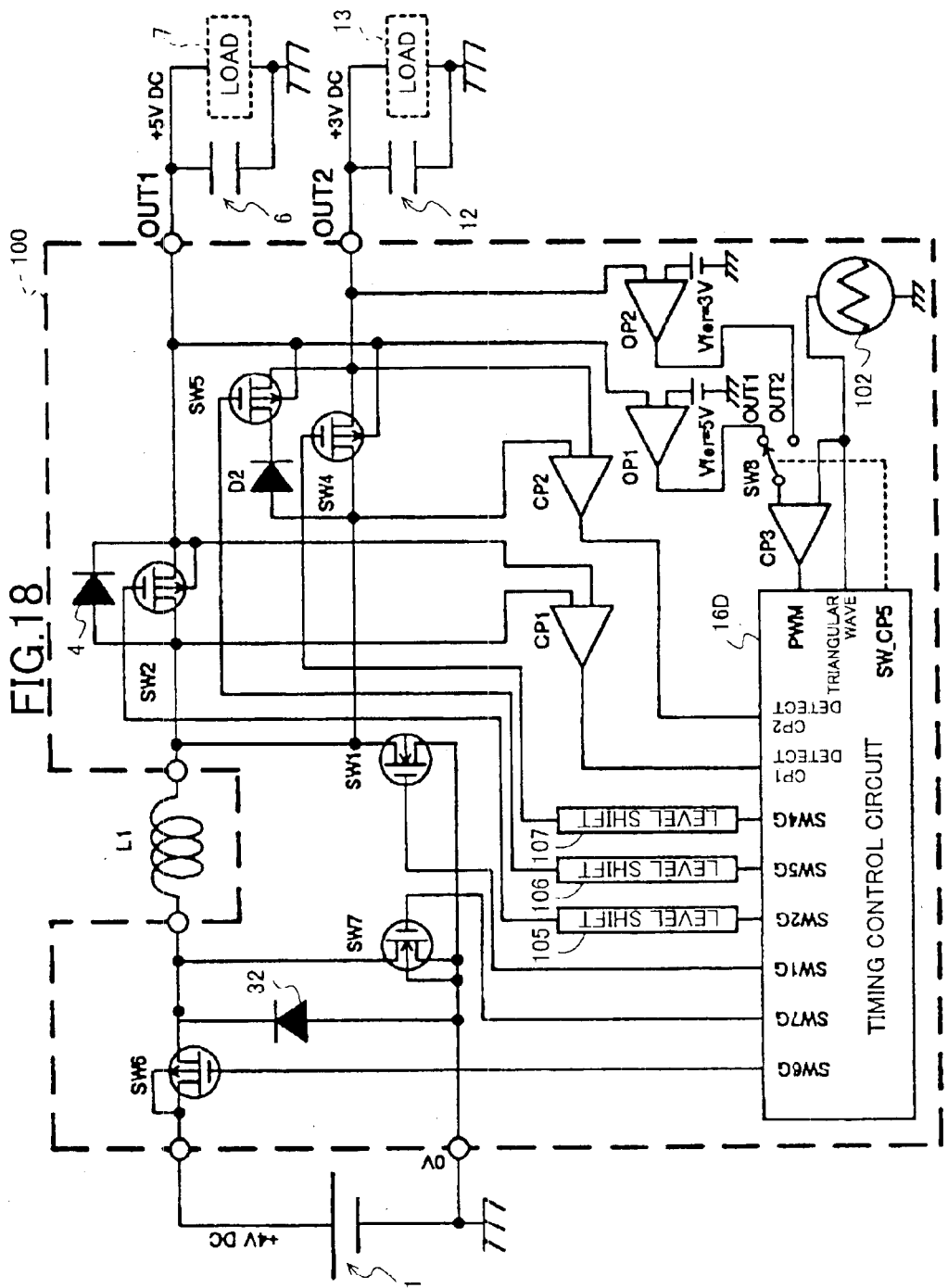
FIG. 18 is a circuit diagram showing a construction of a switching regulator LSI according to the present invention.

FIG. 18 is a circuit diagram showing a construction of a switching regulator LSI according to the present invention. A switching regulator LSI 100 of FIG. 18 corresponds to the switching regulator of the seventh embodiment shown in FIG. 14. In FIG. 18, the same elements as those of FIG. 14 are referred to by the same numerals, and a description thereof will be omitted.

The switches SW1, SW2, SW4, SW5, SW6, and SW7 are comprised of MOS-FETs having small ON-resistance. The gate nodes of the FETs are driven through logical control by the timing control circuit 16D. Level shifter circuits 105 through 107 are inserted along some of the paths from the timing control circuit 16D to the switches. These level shifter circuits converts the power potential used by a logic circuit of the timing control circuit 16D so as to generate a potential that conforms to the switch operation point of a gate potential for turning on the MOS-FETs. For example, outputs of the logic circuit may range from 0 V to 4 V, which is converted into the gate potential ranging from 0 V to 5 V.

CP1 through CP3 are comparators for comparing potentials. CP1 and CP2 need to be highly sensitive and operate at high speed. CP1 and CP2 compare potentials between the opposite ends of the switches SW2 and SW4, respectively, i.e., between the node coupled to the inductor L1 and the node coupled to the output terminal. Based on the comparison, timing at which the electric current becomes zero is detected. Namely, CP1 and CP2 detect the fact that the potential at the node coupled to the inductor L1 is lower than the potential at the node coupled to the output terminal as a result of energy discharge from the inductor L1 to the output terminal. The detection by CP1 and CP2 is supplied to the timing control circuit 16D. In response, the timing control circuit 16D turns off the MOS-FETs of the switches SW2 and SW4.

Vrefs supplied to the operation amplifiers OP1 and OP2 are reference potentials equal to the desired voltages of OUT1 and OUT2, respectively. Each of OP1 and OP2 compares the actual output potential with the reference potential to amplify the differential, and supplies the amplified differential potential to CP3. CP3 compares the output of OP1 or OP2 with the potential of a triangular wave, thereby controlling the widths of PWM pulses output from the timing control circuit 16D.

Figure 19:
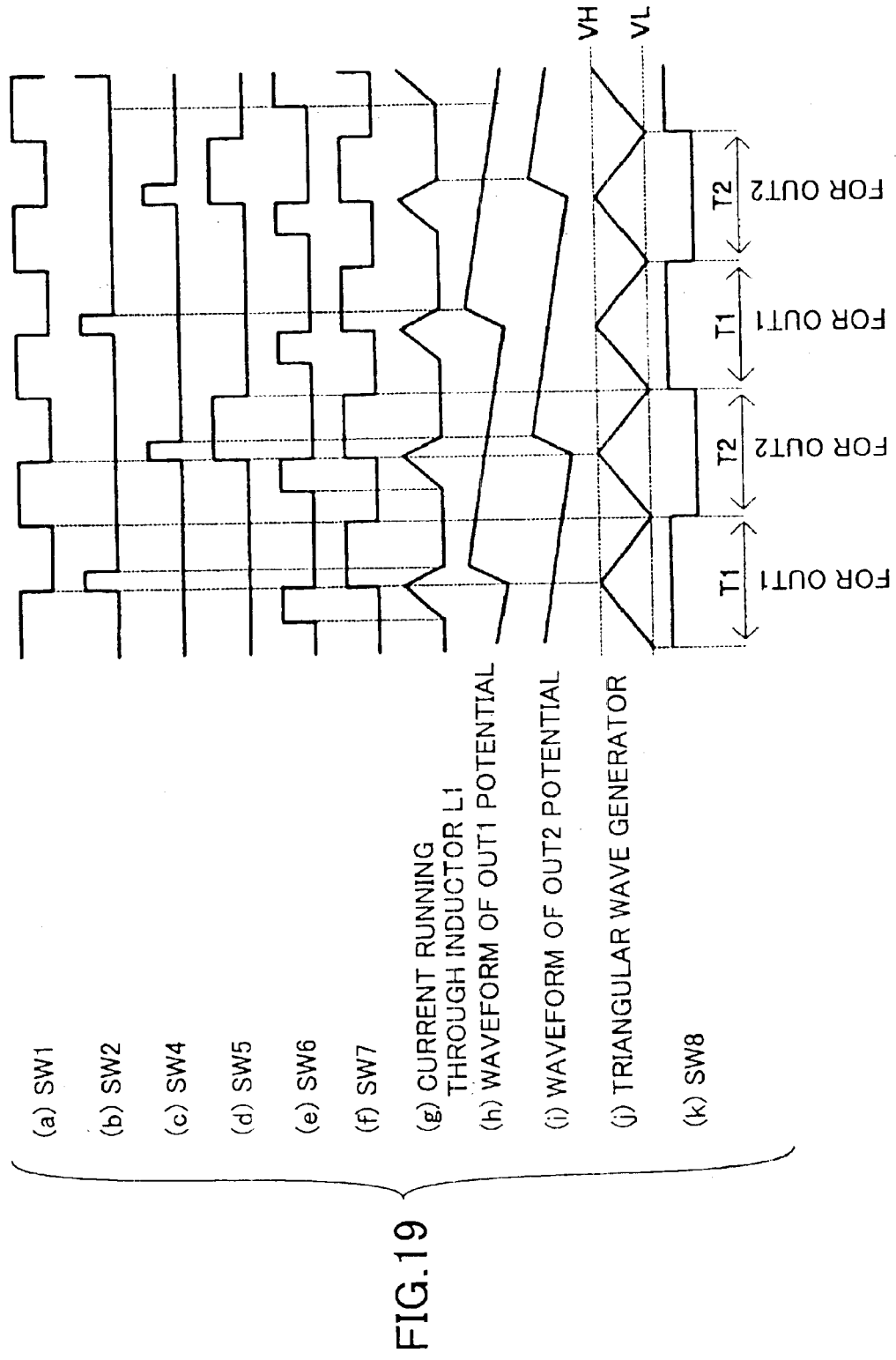
FIG. 19 is a timing chart showing an example of the timing control of switches.

The switch SW8 switches between the output of OP1 and the output of OP2 to conform to the operation of the timing control circuit 16D that is performed on a time-division basis between OUT1 and OUT2. The switching timing is synchronous with the operation of the triangular-wave generator 102. Based on the triangular wave of the triangular-wave generator 102 and the width of PWM pulses output from CP3, the timing control circuit 16D controls the gate nodes of the MOS-FETS. FIG. 19 is a timing chart showing an example of the timing control of the switches.

As shown in FIG. 18, the DC power supply, the inductor, and the condensers are provided as parts external to the switching regulator LSI 100. In the same manner, a switching regulator LSI may be implemented in respect of the first-sixth and eighth embodiments by providing DC power supplies, inductors, and condensers as external parts. In the first through eighth embodiments, condensers may alternatively be provided as a built-in component of the switching regulator LSI.

Figure 20:
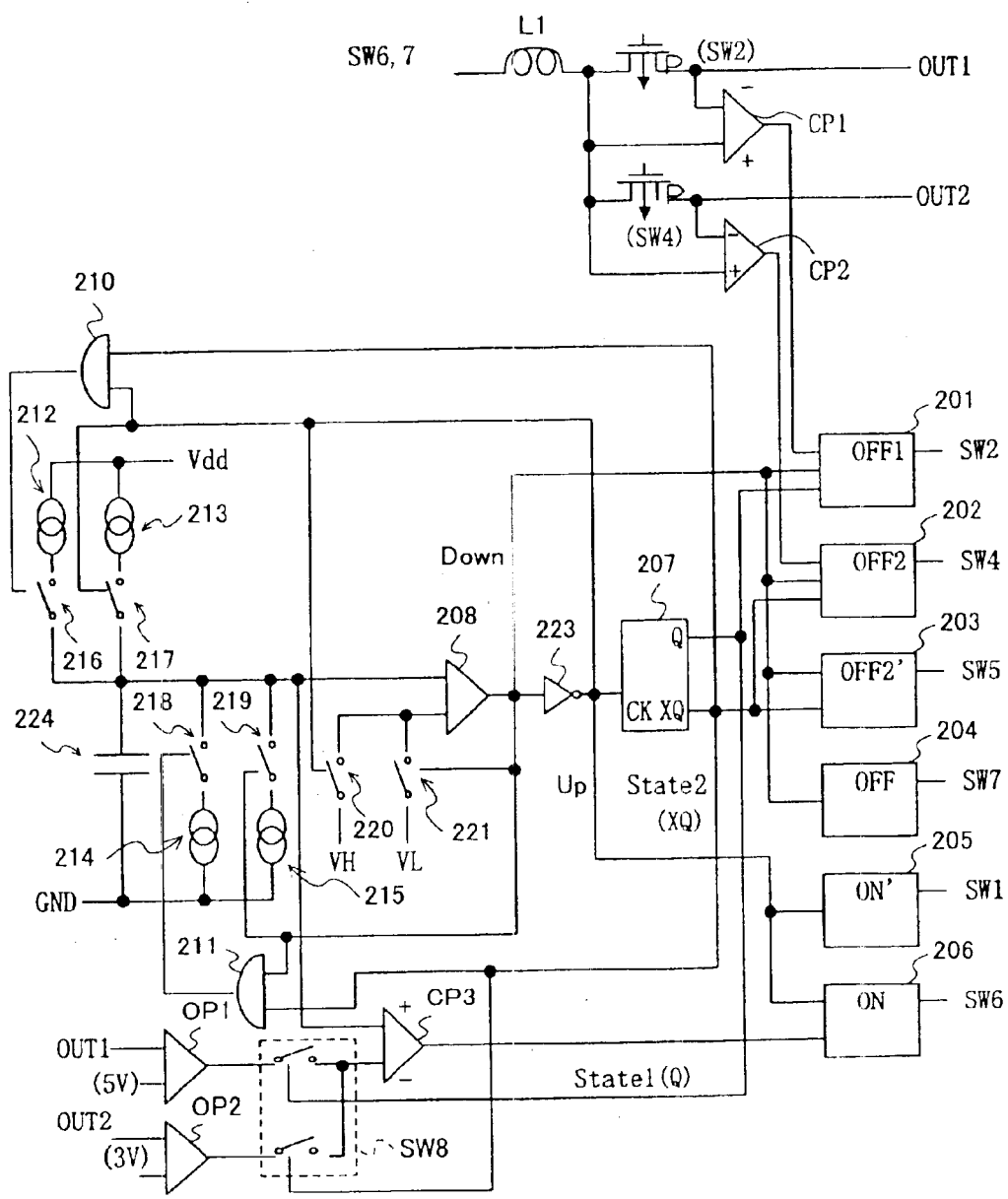
FIG. 20 is a circuit diagram showing the construction of a timing control circuit shown in FIG. 18 together with surrounding circuitry.

FIG. 20 is a circuit diagram showing the construction of the timing control circuit 16D of FIG. 18 together with surrounding circuitry. In FIG. 20, the same elements as those of FIG. 18 are referred to by the same numerals, and a description thereof will be omitted. In FIG. 20, the triangular-wave generator 102 of FIG. 18 corresponds to current sources 212 through 215, switches 216 through 219, and an oscillation capacitor 224. Either the current source 212 or the current source 213 provides an electric current to the oscillation capacitor 224, thereby generating a positive transition of the triangular wave that increases at a predetermined slope. An electric current is discharged from the oscillation capacitor 224 to either the current source 214 or the current source 215, thereby generating a negative transition of the triangular wave that decreases at a predetermined slope. Depending on whether a toggle flip-flop 207 asserts its output at Q (State1) or XQ (State2), a mode is switched between the driving of a single current source or the driving of two current sources, which determines the slope of the triangular wave. This corresponds to the case of FIG. 9(g).

A comparator 208 compares the potential of the triangular wave with VH or VL, thereby generating a Down signal for controlling a driver 201 for the switch SW2 and the like. The Down signal is inverted by an inverter 223 to generate an Up signal, which is supplied to drivers 205 and 206 for driving the switches SW1 and SW6. The Down signal is HIGH during the negative transition of the triangular wave, and the Up signal is HIGH during the positive transition of the triangular wave. The toggle flip-flop 207 is toggled by the Up signal so as to alternate between State1 and State2. State1 corresponds to the OUT1 operation mode, and State2 corresponds to the OUT2 operation mode.

The driver 201 for driving the switch SW2 receives the State1 signal, the Down signal, and the output of CP1. The driver 201 generates a HIGH pulse during the negative transition of the triangular wave in the OUT1 operation mode until the output of CP1 becomes HIGH. The driver 202 for driving the switch SW4 receives the State2 signal, the Down signal, and the output of CP2. The driver 202 generates a HIGH pulse during the negative transition of the triangular wave in the OUT2 operation mode until the output of CP2 becomes HIGH. The driver 203 for driving the switch SW5 receives the State2 signal and the Down signal, and generates a HIGH pulse that lasts during the negative transition period of the triangular wave in the OUT2 operation mode. The driver 204 for driving the switch SW7 receives the Down signal, and generates a HIGH pulse that lasts during the negative transition period of the triangular wave in the OUT1 and OUT2 operation modes. The driver 205 for driving the switch SW1 receives the Up signal, and generates a HIGH pulse that lasts during the positive transition period of the triangular wave in the OUT1 and OUT2 operation modes. The driver 206 for driving the switch SW6 receives the Up signal and a CP3 output indicative of the width of a PWM output pulse, and generates a HIGH pulse corresponding to the width of the PWM output pulse during the positive transition period of the triangular wave in the OUT1 and OUT2 operation modes. By these pulse signals, the timing control of the switches are attended to as shown in FIG. 19.

In the construction as described above, the closed period of the switch SW1 is constant whereas the closed period of the switch SW6 is adjusted according to the potential of the outputs OUT1 and OUT2. Through this adjustment, the amount of energy accumulated in the inductor L1 is controlled, thereby attaining desired potentials for the output OUT1 and the output OUT2.

Further, the present invention is not limited to these embodiments, but various variations and modifications may be made without departing from the scope of the present invention.

What is claimed is:

1. A switching regulator circuit, comprising:

an inductor;

a first condenser which provides a potential stored therein as a first output of said switching regulator circuit;

a second condenser which provides a potential stored therein as a second output of said switching regulator circuit;

a switch set including a plurality of switches, said switch set establishing a first path, a second path, and a third path, said first path supplying energy from a DC power supply to said inductor for accumulation of the energy therein, said second path supplying the energy accumulated in said inductor to said first condenser, and said third path supplying the energy accumulated in said inductor to said second condenser; and a timing control circuit which controls said switch set such that said first path and said second path are successively established in an order named within a first cycle for controlling the first output, and said first path and said third path are successively established in an order named within a second cycle for controlling the second output, the first cycle and the second cycle alternating with each other and having respective fixed durations, and the duration of said first path and the duration of said second path being controlled independently of each other.

2. The switching regulator circuit as claimed in claim 1, wherein said timing control circuit closes said second path and said third path in response to detection that an electric current running through said inductor becomes zero.

3. The switching regulator circuit as claimed in claim 1, further comprising a diode provided in parallel to a switch of said switch set between said inductor and one of the first and second condensers, said one of the first and second condensers corresponding to a highest-potential output among the first output and the second output, wherein an electric current from said inductor runs through said diode.

4. The switching regulator circuit as claimed in claim 1, further comprising a diode provided between said inductor and one of the first and second condensers, said one of the first and second condensers corresponding to a highest-potential output among the first output and the second output, wherein an electric current from said inductor runs through said diode.

5. The switching regulator circuit as claimed in claim 1, further comprising a series connection of a diode and a switch, said series connection being provided in parallel to a switch of said switch set between said inductor and one of the first and second condensers, said one of the first and second condensers being different from a condenser that corresponds to a highest-potential output among the first output and the second output.

6. The switching regulator circuit as claimed in claim 1, further comprising a series of diodes that is provided in parallel to said inductor.

7. The switching regulator circuit as claimed in claim 1, wherein said switch set establishes a fourth path through which energy is supplied to said inductor from another DC power supply.

8. The switching regulator circuit as claimed in claim 1, wherein said switch set establishes a fourth path through which an end of said inductor is coupled to a fixed potential after one of said second path and said third path is opened.

9. A switching regulator circuit, comprising:

an inductor;

a condenser; and a switch set including a plurality of switches, said switch set establishing a first path, a second path, a third path, and a fourth path, said first path supplying energy from a DC power supply to said inductor for accumulation of the energy therein, said second path supplying the energy accumulated in said inductor to said condenser, said third path returning the energy accumulated in said condenser to said inductor, and said fourth path being a path through which the energy returned from said condenser to said inductor through said third path is returned to the DC power supply.

10. A switching regulator circuit, comprising:

terminals to be coupled to an external DC power supply;

terminals to be coupled to an external inductor;

terminals to be coupled to a first external condenser;

terminals to be coupled to a second external condenser;

a switch set including a plurality of switches, said switch set establishing a first path, a second path, and a third path, said first path supplying energy from the external DC power supply to the external inductor for accumulation of the energy therein, said second path supplying the energy accumulated in the external inductor to the first external condenser, and said third path supplying the energy accumulated in the external inductor to the second external; and a timing control circuit which controls said switch set such that said first path and said second path are successively established in an order named within a first cycle for controlling the first external condenser, and said first path and said third path are successively established in an order named within a second cycle for controlling the second external condenser, the first cycle and the second cycle alternating with each other and having respective fixed durations, and the duration of said first path and the duration of said second path being controlled independently of each other.

* * * * *